Ubbe E. Iwerks, INVENTOR.
BY
ATTORNEY.

Sept. 21, 1948.   U. E. IWERKS   2,449,702
ANIMATING DEVICE
Filed Dec. 8, 1944   4 Sheets-Sheet 2
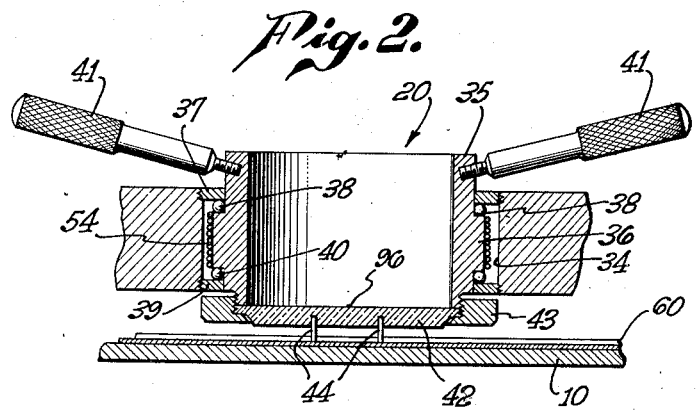
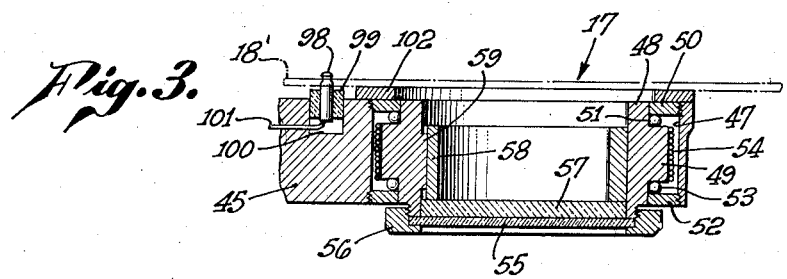
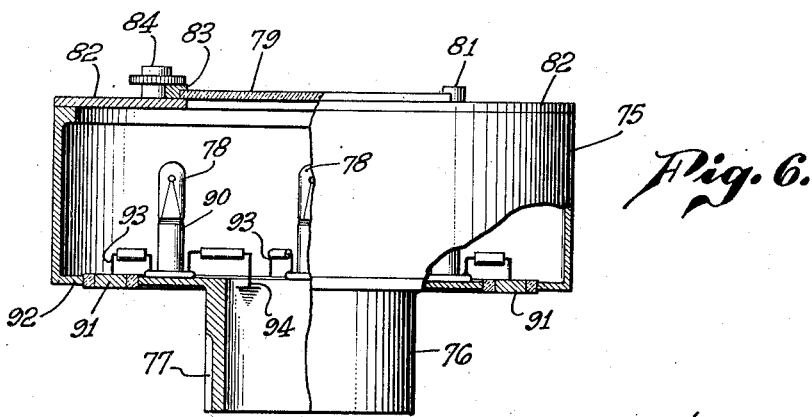
UBBE E. IWERKS,
INVENTOR.
BY
ATTORNEY.

Sept. 21, 1948.                U. E. IWERKS                 2,449,702
                              ANIMATING DEVICE
Filed Dec. 8, 1944                                    4 Sheets-Sheet 3
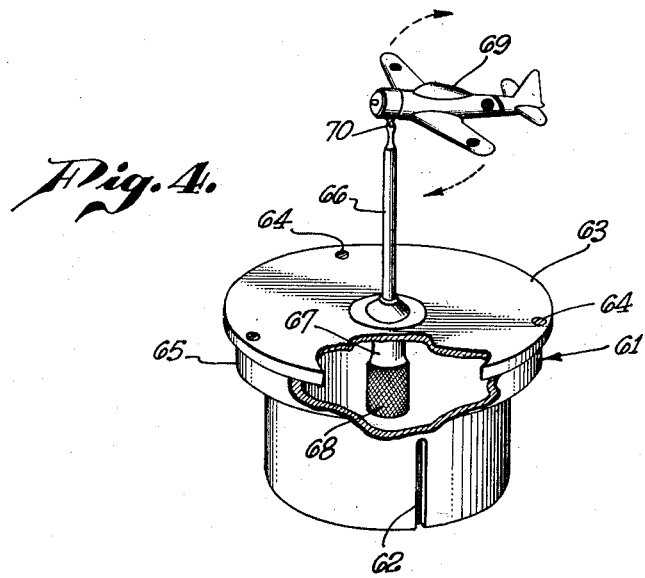
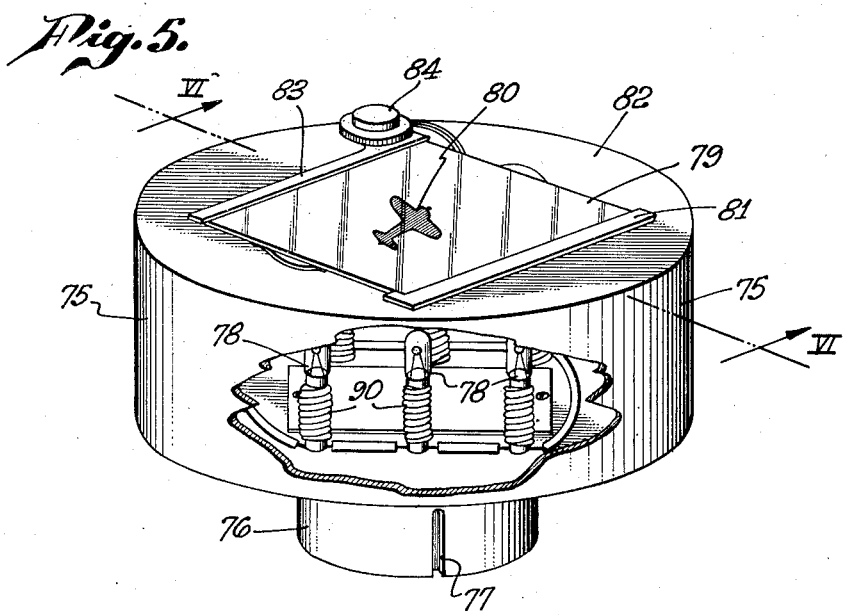
UBBE E. IWERKS,
INVENTOR.
BY
ATTORNEY.

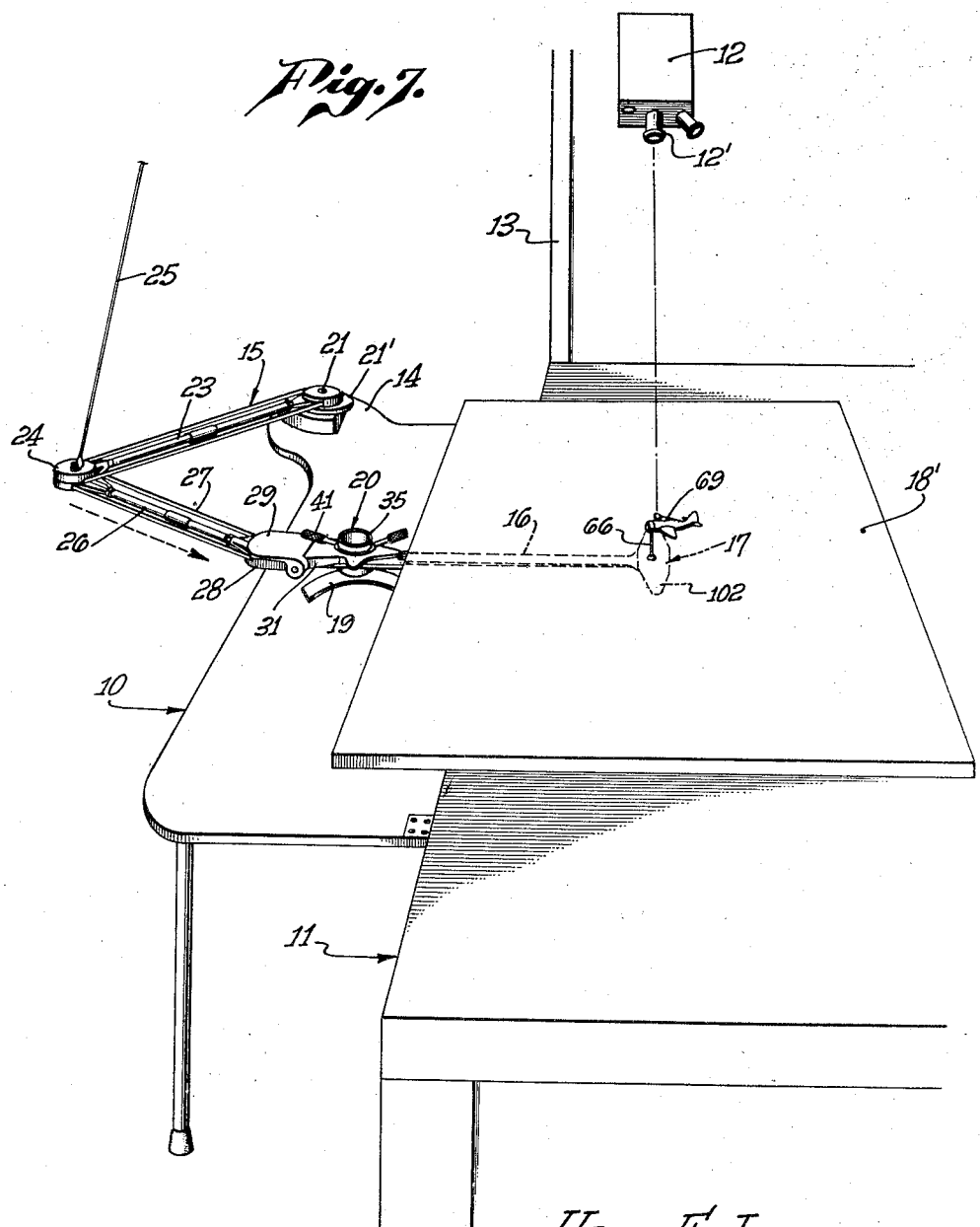

Patented Sept. 21, 1948

2,449,702

UNITED STATES PATENT OFFICE 2,449,702

ANIMATING DEVICE

Ubbe E. Iwerks, Van Nuys, Calif., assignor to Walt Disney Productions, Burbank, Calif., a corporation of California Application December 8, 1944, Serial No. 567,282

15 Claims. (Cl. 88—16)

My invention relates to animating devices used in the photographic art and particularly a means for imparting to inanimate objects in a photographic field a course of motion which simulates or conforms to desired motion of corresponding objects in live action or in accordance with the requirements of the story being portrayed.

The device is particularly useful in the making of what are commonly termed animated cartoons and training films shown as motion pictures and is employed in the process of photographing the objects (such as puppets, models, silhouettes, pictorial representations, miniatures, etc.) in various different positions. On many occasions several objects need to be photographed separately against a neutral background and the separate films combined together and joined with a suitable background in order to make a composite picture of the kind desired. To do this it is necessary to know precisely the path of travel and precise position of each of the separate objects so that after one has been photographed the film can, if desired, be rewound and then used a second time to photograph a second object, the movement of which will be in proper relation to the first. Separate films of different components of the complete picture are sometimes combined by double printing. In all such work, extreme accuracy is required to make certain that the successive frames, upon projection, produce the effect of smooth motion, register properly, etc.

It is therefore among the objects of my invention to provide a new and improved method of and means for controllably and accurately positioning and moving an object photographed by stop-motion so that it will create the appearance of desired, smooth motion when the film is projected.

Another object of my invention is to provide a new and improved controllably rotatable holder for cutouts, silhouettes, models and other objects, with or without a light source, which are adapted to be positioned in the field of view of a camera.

Another object is to provide a new and improved method and means of photographing movement of animated objects independent of a background so that a suitable background may be added later.

Still another object is to provide a new and improved method and means of plotting the motion of several objects in the field of view of a camera and then translating the pattern of motion to one object at a time in the field of view of a camera, thereby simplifying the photographing of each separate object by making it possible to have photographs of all of the objects recorded upon the same film.

Still another object of my invention is to provide a new and improved method and means of plotting motion of an object in a photographic field which takes into consideration not only movement in space but also change of position during movement and to translate both types of movement to the object in the photographic field so that the changes in position and location will be automatically translated without any hand adjustment being necessary.

A further object is to provide a new and improved animating device wherein an arm adapted to carry an object to be photographed is equipped with a suitable mechanism so that in addition to movement of the arm the mechanism may be operated to change the position of any object attached to the arm while the location of the object on the arm is undergoing a change.

A still further object is to provide a new and improved animating device in which an arm adapted to carry an object to be photographed through a field of view of a camera is so constructed that different types of objects and different types of object mountings may be interchangeably attached to the arm as occasion requires.

A still further object is to provide a new and improved animating device including an arm adapted to carry an object to be photographed into a field of view of a camera which includes upon the arm a quick and accurate means of enabling the operator to change the position of the arm in accordance with a previously plotted pattern of movement which can be laid down as a guide alongside of the field of view of the camera.

With these and other objects in view my invention consists in the provision of a method together with an appropriate device for carrying it into effect whereby the objects contemplated are attained as hereinafter more fully set forth, pointed out in my claims, and illustrated by way of example in the accompanying drawings, in which:

Fig. 2 is a longitudinal view of a portion of the device of Fig. 1 designated as a guide head and shown in section.

Fig. 3 is a longitudinal view in section of the outermost end of the device shown in Fig. 1, known and referred to herein as the object head.

Fig. 4 is a perspective view of a modified form of a holder or device which can be positioned in the object head.

Fig. 5 is a perspective view of another modified form of a holder for an object to be photographed which can be positioned in and used with the object head.

Fig. 6 is an elevational view of the device, partly in section, taken on the line VI—VI of Fig. 5.

Fig. 7 is a perspective view showing a slightly modified form of the device equipped for use with the form of the holder shown in Fig. 4.

Figure 1:
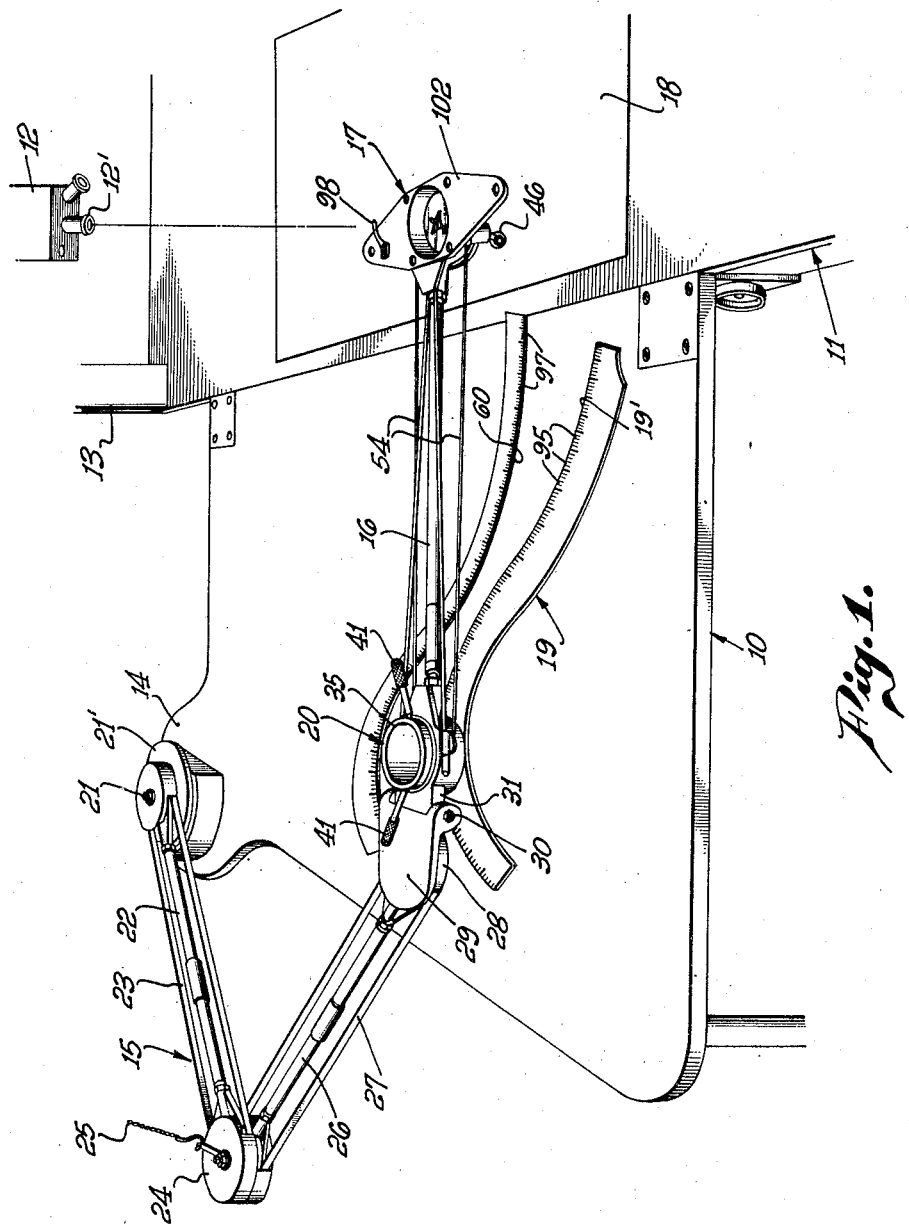
Fig. 1 is a perspective view of a preferred embodiment of my device showing the entire setup of an animating device positioned in proper relation to a camera.

In the preparation of animated pictures and animated cartoons a great many photographs must be taken of animated objects in order that when projected upon a motion picture screen they will give the appearance of motion such as the live action counterparts would have. If the cartoon motion picture is to have a lifelike character, the motion of the cartoon characters must simulate very closely all of the motions, both with respect to movement in space and with respect to change in position, that the objects which they characterize would have. This becomes exceedingly complicated as the number of cartoon characters is increased. The object, such as a miniature, may often move only a minute distance (on the order of thousandths of an inch) between photographic exposures. What still further complicates the process is the necessity for including a particular background for the pictures which may sometimes change as the cartoon characters move with respect to it. In photographing live action this may be accomplished by an operation known as trucking which consists of moving the motion picture camera from one place to another. In the preparation of cartoon strips this simple expedient may not be feasible and the background and setting within which the cartoon characters are acting may need to be changed. On other occasions, it becomes necessary to make a reproduction of the same cartoon character in several different sizes such as it would have when close to and far away from the camera. To show animation in a cartoon strip normally requires thousands of drawings made carefully and accurately. Use of the device of this invention with a simple model or drawing may replace some thousands of the drawings.

In training films (such as those for use in teaching tactics, flying, etc.) it becomes highly desirable to concentrate upon one or more objects. In doing this it is often advisable to photograph the object against a non-actinic background so that the image of the character or object alone is recorded on the film. When photographs of the movement of the object or character have been satisfactorily produced, a background can then be added. There can also be added to it the photograph of a second or third object or character. Moreover, the camera may be loaded with a positive or a negative film and thus may be used to obtain a composite directly, if desired.

To make an animated device sufficiently versatile to take care of all these various requirements, it becomes desirable to have a means for carrying the object to be photographed so constructed that objects of different kinds may be readily substituted for the original, and all such objects accurately and positively moved or positioned in accordance with a predetermined plan, so that a desired rate of movement along a predetermined path is properly recorded upon the film.

One means of accomplishing the desired result is by use of the device shown in perspective in Fig. 1. A guide table 10 is positioned at the side of a stationary camera table 11 which supports a camera 12 having a lens mounting 12' by means of vertical columns 13. On one corner 14 of the guide table is mounted a parallel motion device 15 which has an operating arm 16 overlying the guide table with an object head 17 overlying a neutral background board 18 positioned on the stationary camera table. A chart or template 19 is prepared, such template having an edge of a predetermined curvature correlated to desired changes in position which are to be imparted to an object held by the object head. This chart or template 19 is carried by the guide table and when the guide head 20 is moved along the edge of the chart, movement in accordance with the predetermined curvature of the chart edge is imparted to the object held by the object head.

Specifically the parallel motion device consists of a rotating element 21 swivelly mounted upon base 21' on the corner 14 of the guide board and provided with a shaft 22 and a belt 23 which extend together to a housing 24 within which are conventional movable elements. The housing 24 is supported in upward position by means of a chain 25. Another shaft 26 extends outwardly from the housing together with a belt 27 to a second housing 28 which is similarly movable in cooperation with the shaft and belt. A platform 29 is supported by means of a hinge 30 to a plate 31. Attached to the plate 31 is the operating arm 16 the motion of which is controlled entirely by the guide head 20.

As shown in greater detail in Fig. 2 the guide head 20 has a circular aperture 34 therein and within the aperture is mounted a sleeve 35 which has an outer flange 36. A retaining ring 37 holds a set of bearings 38 between itself and one side of the flange 36 while a retaining ring 39 holds a second set of bearings 40 between itself and the other side of the flange. By this means the sleeve rotates freely within the aperture. In order to help guide rotation of the sleeve handles 41 may be provided.

Forming a bottom for the sleeve is a transparent disc 42 which is secured to the lower edge of the sleeve by means of a locking ring 43. Guide pins 44 extend from the transparent bottom downwardly to the guide board. The object head 17 is constructed in a manner similar to the guide head. It consists of a base 45 at the end of the arm 16 which is designed to be supported by means of a swivelled roller 46 upon the background 18. The base has an aperture 47 therein and an object head sleeve 48 is adapted to be received in the aperture. The sleeve 48 includes an outwardly projecting flange 49. A retaining ring 50 holds a set of bearings 51 between itself and one side of the flange and a retaining ring 52 holds a set of bearings 53 between itself and the other side of the flange. A cable belt 54 extends around the flange of the sleeve in the guide head and around the corresponding flange of the sleeve in the object head so that the object head is made to rotate the same amount and in the same direction as the guide head. By this device whatever motion in rotation is imparted to the guide head will be reproduced in the object head.

In this particular embodiment the object head is provided with a transparent disc 55 attached to the sleeve by means of a locking ring 56. Above the transparent disc is a plate 57 bearing a cutout or silhouette or similar object to be photographed. A positioning ring 58 is designed to be pressed against a flange or key 59 extending inwardly from the inside wall of the sleeve and is adapted to snugly hold the plate bearing the cutout against the transparent disc. Whatever the subject is, therefore, it will be rotated and positioned upon the camera background in precise accordance with the rotation and position of the guide head 20. It should be borne in mind that all the exposed surfaces and particularly the surfaces on the top side of the guide head as well as the background and a portion of the supports for the object head are non-actinic so that they will not photograph.

In order that the object may simulate live action, the guiding edge of the template is fashioned to provide a desired path for the animation positions of the object. This produces a template with an edge which may be curved, straight, zigzag, or otherwise directed so as to define a path of movement. The edge is graduated so as to indicate thereon not only the proper position of the object for successive frames of pictures, but also by reason of the shape of the template the motion of the object through space. Where the movements of two objects are to be correlated, a curved chart or template 60 is provided with its face adjacent to and cooperating with the face of the template 19.

In the modified form of my invention illustrated in Fig. 4 there is provided a holder 61 which is designed to be inserted snugly within the aperture in the object head 17. The key way 62 may cooperatively engage key 59 and the sleeve 48. This assures that the initial position of the holder will be consistently correct each time that it is applied to the device. It also means that the holder will be rotated in accordance with rotation of the object head 17.

As shown in the drawings, the holder consists of a top plate 63 attached by means of screws 64 to a flange 65 on the upper portion of the holder. At the center of the top plate of the holder is a vertical shaft 66 which is rotatably mounted on the plate. The shaft has a lower portion 67 to which is attached a knurled end 68 by means of which the shaft may be rotated. An object 69 to be photographed, such for example as an airplane, is attached to the top of the vertical shaft by means of a universal joint 70. By use of a universal joint the object airplane can be tilted or rotated in any direction.

A second modified form of an object head is illustrated in Fig. 5. In this form there is provided a drum 75 which has a reduced cylindrical lower portion 76 designed to fit within the sleeve of the object head. This cylindrical portion is provided with a key way 77 to engage the key 59 of sleeve 48 and properly orient the drum 75. The upper portion of the drum is hollow and has positioned therein a plurality of electric lamps 78 by means of which light may be evenly distributed over an opaque plate 79 which carries a clear cutout image 80. The image therefore regardless of where it is located will be uniformly lighted. A plate holder strip 81 is located at one side of a top 82 of the drum and a second plate holder strip 83 is located on the opposite side. A nut 84 is provided in order to tighten the plate in place between the strips.

The lamps previously referred to are mounted in sockets 90. To provide an electric connection for the lights a commutator ring 91 is inserted in a bottom 92 of the drum 75. Although the lamps 78 are shown connected in parallel by means of wires 93 attached to the ring and a wire 94 which is grounded, it is contemplated that the lamps may be connected in series if desired.

A resilient brush element 98 in the base 45 has an insulated bushing 99 received in an aperture 100. A lead wire 101 makes contact with a source of electric current.

In operation diagrams are made of the prospective fields of view and the motion of the particular objects which will move across those fields of view is similarly diagrammed and reduced to a template form as exemplified by the template 19. The chart or template is provided with a substantial thickness so that the edge may act as a guide edge. The template customarily is provided with graduations 95 so as to indicate successive positions of the object as it would appear in successive frames of a motion picture film. The template is provided with a curved edge to indicate a correspondingly curved path through the field of view of the camera. The guide head is then set at one end of the template. This means that the object head will be set in a corresponding position against the background in the field of view of the camera. At this point one picture is taken. It should be borne in mind in connection with this that all parts of the equipment which appear in the field of view of the camera are non-actinic so that their form will not be registered on the photographic film, thereby permitting only the image of the object to be recorded. Next the guide head is moved along the template to the next graduation. Guide pins 44 both bear against the curved edge of the template and during movement will cause the guide head to rotate in one direction or another depending upon the direction and degree of curve of the edge of the template. An arrow, dotted line, or similar indication 96 in the center of the transparent bottom of the guide head can be used as a means of locating the guide head adjacent the proper graduation to correspond with the frame of motion picture film.

When the guide head has been moved to the second graduation a second picture is taken. Then as the guide head continues to be moved successively to the third, fourth, fifth, etc., positions, the third, fourth, fifth and subsequent pictures will be taken one at a time. Each time the guide head moves through one graduation the object is moved in space an equivalent distance and the object will also be rotating in space in an amount corresponding to the curve at the edge of the template. Thus the object will undergo two distinct types of motion for each new frame of pictures. The graduations or indicia 95 determine the apparent speed of movement of the object across the field of view, many successive exposure positions within a unit of length of curve (or of time) producing the effect of slow motion. After the object has moved the length of the template which may be clear across the field of view of the camera, a new template is provided drawn in accordance with the next successive movements, the guide head is repositioned and the process starts all over again. It is, of course, possible to move the camera from time to time to new positions as the objects move over relatively long distances.

Should it be desired to record the motion of two different objects on the same film the motion of one object may first be photographed in the manner just described. Then the film may be turned back in the camera to its starting point and the second template 60 employed to guide a second object. The template 60 is laid on the guide board in its proper position relative to the first template and a second object to be photographed, which may be different from the first, may be inserted in the object head. The guide pins 44 may be placed at the beginning of the second template and the initial picture of the second object may be photographed in the same frame as the initial picture of the first object. There will then be photographs of two objects in the same picture frame devoid of background. Successive pictures of the second object may then be taken by following the same sequence as described in connection with the taking of pictures of the first object, that is by moving the guide head step by step along graduations 97 of the template 60.

If desired, still a third object may be photographed on the same length of film in a similar manner.

After the necessary sequence of pictures has been taken of the objects the film may be applied against a suitable background appropriate to the objects.

The same sequence of operations applies to each of the different modifications of the object head described particularly in connection with Figs. 4, 5, and 6.

Should more complicated manipulation of the object be desired, it may become necessary to use only one guide pin and locate it in the center of the bottom of the guide head. This single guide pin will be moved along the curved edge of a template in the same manner and at the same rate as that described for a guide head having two pins. Under these last circumstances, however, it becomes necessary to manually manipulate the object, as for example, the miniature airplane 69. A more exaggerated movement of the plane can be had by manual manipulation at times than can be accorded to it by an appropriate curve of the template. There are some motions of objects which could not be readily reproduced by the curve of the template. An example is the skidding of a racing car or the side slip of an airplane in the wind. Motion across the field of view will be the same in each case. In using a model such as an airplane it may likewise be advisable to fasten the opaque mat 18' to the top plate 102 on the object head (as shown in Fig. 7) so that it can be moved together with the plane in the field of view of the camera.

I claim:

1. A device for regulatably controlling the movement of silhouettes, cutouts, models and other objects in the field of view of a motion picture camera comprising a movably mounted arm, one end of said arm being located in the field of view of a camera, the other end of said arm being located over a chart, a guide head rotatably mounted on the end of the arm adjacent the chart, an object head rotatably mounted on the arm at the other end for holding the object to be photographed and a connecting means between said heads whereby rotary movement of one is translated to the other, said chart having a line tracing the path of movement of the object to be photographed and having spaced indications thereon graduated to correspond with the number of frames of a motion picture film selected to reproduce the sequence of movement, and a guide pin on the guide head to be moved along said line tracing the path of movement in accordance with the spaced indications.

2. A device for regulatably controlling the position of silhouettes, cutouts, models and other objects in the field of view of a camera comprising a movably mounted arm, one end of said arm being located in the field of view, the other end of said arm being located over a guide board, a guide head mounted on the end of the arm adjacent the guide board, an object head mounted on the arm at the other end for holding the object to be photographed, a template on the guide board having an edge of a predetermined curvature correlated to desired changes in position to be imparted to an object held by the object head, said template having spaced indications thereon graduated to correspond with the number of frames of a motion picture film used to denote the simulated movement, a guide pin on the bottom of the guide head adapted to contact the said edge of the template and be moved therealong in accordance with the spaced indications, means connecting said object head and said guide head for simultaneous movement, whereby said object head will assume the positions set by the guide head in conformance with the curve of the template.

3. In a device for regulatably controlling the movement of inanimate objects in the field of view of a motion picture camera the combination of: a parallel motion device having an arm extending at one end over a guide board and movable relative thereto and having the other end within said field of view, said first end having a rotatably mounted guide head therein, said other end of the arm having an aperture therein, an object head comprising an annular sleeve in the aperture, a pair of retaining rings one on each side of the aperture surrounding the sleeve, bearings between the rings and the sleeve adapted to rotatably support the sleeve on the arm; a driving cable surrounding the sleeve between the bearings and connected to the guide head, a transparent base forming a bottom for the sleeve, a locking ring adapted to hold the base on the sleeve, a cutout or silhouette object on the base, a retainer on the inner wall of the sleeve for holding the object in place, and a support on said object head adapted to engage a supporting surface.

4. In a device for regulatably controlling the movement of inanimate objects in the field of view of a camera the combination of: a device having an arm extending at one end end over a guide board in movable relation thereto and at the other end extending into the field of view, said first end having a rotatable guide head therein, said other end of the arm having an aperture therein, an object head positioned in the aperture, a pair of retaining rings one on each side of the aperture surrounding the object head to rotatably support the object head on the arm, a driving connection between the object head and the guide head, and means carried by the object head for holding an object to be photographed.

5. In a device for regulatably controlling the movement of silhouettes, cutouts, models, and other objects, the combination of: an arm mounted for movement to a succession of positions parallel to itself, one end of the arm overlying a guide board and the other extending beyond the guide board into the field of view of a camera; a guide head carried by the arm above the guide board; an object head carried by the other end of the arm for holding an object to be photographed; a chart carried by the guide board, said chart having a line tracing a desired path of movement of the object to be photographed; means connecting said heads for simultaneous rotation; and a guide pin on the guide head in contact with said line for rotating said guide head in response to movement of said pin along said line.

6. A device of the character stated in claim 5 wherein the guide head is rotatably mounted in the arm, the object head is rotatably mounted in the arm and said heads are mechanically coupled whereby rotation of the guide head is translated into rotation of the object head and object carried thereby.

7. A device of the character stated in claim 5 wherein the guide head comprises a sleeve, an aperture in the arm in which said sleeve is rotatably mounted, retaining rings for restricting the sleeve from axial movement, a transparent bottom in said sleeve in which the guide pin is mounted; a rotatable object head; and means mechanically coupling the guide head and object head for transmitting rotation of the guide head to the object head.

8. A device of the character stated in claim 5 wherein the object head includes an object holder provided with means for illuminating the object.

9. A device of the character stated in claim 5 wherein the guide head is rotatably mounted in the arm, the object head is rotatably mounted in the arm and said heads are mechanically coupled whereby rotation of the guide head is translated into rotation of the object head; and an object holder removably held by the object head, said removable holder including a hollow, enclosed, light box, means for positioning an object on said light box, and light sources carried within said light box.

10. A device of the character stated in claim 5 wherein the chart is provided with indicia along the line tracing a desired path of movement, such indicia indicating positions for the guide pin during photography of the object held by the arm.

11. A device for regulatably controlling the movement of silhouettes, cutouts, models, and other objects in the field of view of a motion picture camera, comprising: a movable operating arm, one end of said arm being located over a photographic background, the other end of said arm extending therebeyond over a guide board; a guide head rotatably mounted on the end of the arm adjacent the guide board; an object head rotatably mounted on the arm at the other end for holding the object to be photographed; a connecting means between said heads whereby rotary movement of one is translated to the other; a template on the guide board, said template having an edge of a predetermined curvature correlated to desired changes in position to be imparted to an object held by the object head; spaced indicia carried by the template adjacent said curved edge, said indicia corresponding with the number of frames of a motion picture film used in recording animated movement; and a guide pin on the bottom of the guide head to contact the edge of the template for movement therealong in accordance with the indicia.

12. In a device of the character stated in claim 11, the provision of a pair of guide pins on said guide head for simultaneous contact with the edge of template.

13. A device of the character stated in claim 11 wherein the operating arm is mounted for movement to a succession of positions parallel to itself.

14. In a device for regulatably controlling the movement of inanimate objects in the field of view of a motion picture camera, the combination of: a parallel motion device having an operating arm extending at one end over a guide board and movable relative thereto, the other end of the arm extending beyond the guide board into the field of view of a camera, said first end having a rotatably mounted guide head therein, the other end of the arm having an aperture therein with its axis virtually parallel to the axis of the lens of the camera; an object head positioned in the aperture, said object head including an annular sleeve having a peripheral flange; a pair of retaining rings one on each side of the aperture and surrounding the sleeve; bearings between the rings and the flange to rotatably support the sleeve on the arm; a driving cable surrounding the flange between the bearings connected with the guide head; a transparent base forming a bottom for the sleeve; and a locking ring to hold the base on the sleeve.

15. In a device of the character stated, the combination of: a parallel motion device having an operating arm with one end over a guide board and the other end extending therebeyond into the field of view of a camera, said first end having a rotatably mounted guide head therein; the other end of the arm including a substantially vertical aperture; an object head rotatably mounted in said aperture, said object head including an annular sleeve; a driving cable surrounding the sleeve and connecting the same with the guide head; a removable object holder carried by the sleeve, said object holder being rotatable with said sleeve; a top for the object holder; and a vertical support mounted on said top, the upper end of said vertical support including a universal connection for an object to be photographed.

UBBE E. IWERKS.

REFERENCES CITED

The following references are of record in the file of this patent:

UNITED STATES PATENTS

| Number | Name | Date |
|--------|------|------|
| 460,762 | Sabel | Oct. 6, 1891 |
| 669,549 | Roche | Mar. 12, 1901 |